Nov. 14, 1933.  F. J. LAHER  1,934,767
SPRING CONSTRUCTION
Filed July 22, 1929
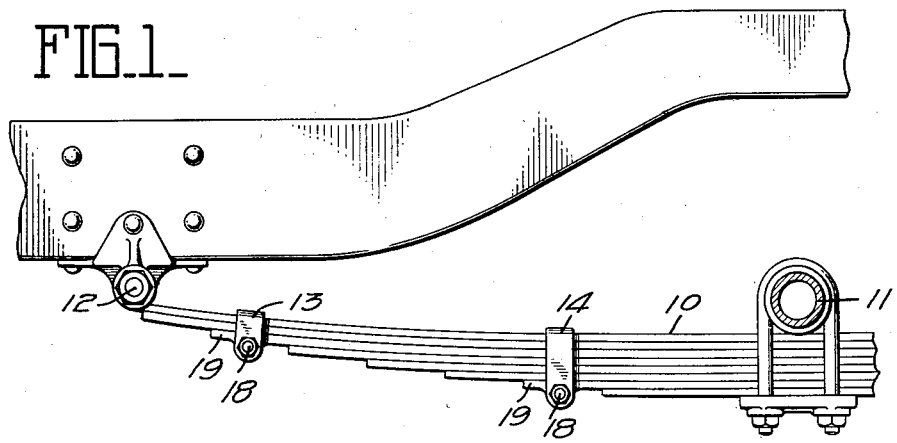
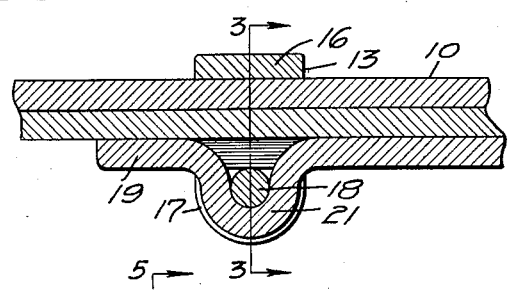
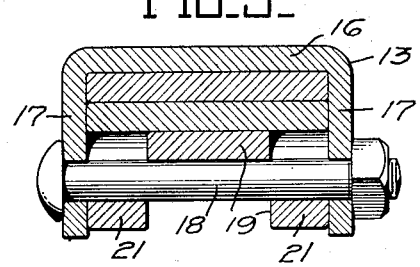
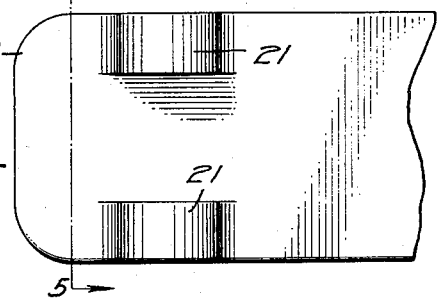
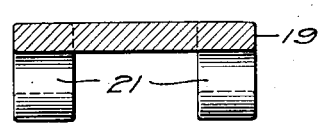
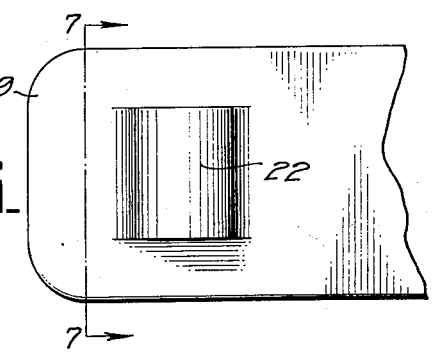
INVENTOR.
Frank J. Laher
BY White, Prost, Flehr & Lothrop
ATTORNEYS.

Patented Nov. 14, 1933

1,934,767

UNITED STATES PATENT OFFICE 1,934,767

SPRING CONSTRUCTION

Frank J. Laher, Oakland, Calif.

Application July 22, 1929. Serial No. 379,981

3 Claims. (Cl. 267—47)

This invention relates generally to the construction of springs such as are utilized on vehicles. It relates particularly to the arrangement of a multi-leaf spring with clip means for retaining the individual leaves of the spring together.

It is an object of this invention to devise a spring construction having one or more retaining clips, which will be relatively cheap to manufacture, and which will afford a neat appearance.

It is a further object of this invention to devise a spring construction which will permit the retaining pin or bolt of a spring clip to be placed on the under side of the spring, but which will avoid the necessity of rolling an eye in the end of a lower leaf.

Further objects of the invention will appear from the following description in which I have set forth the preferred embodiment of my invention. It is to be understood that the appended claims are to be accorded a range of equivalents consistent with the state of the prior art.

Referring to the drawing:

Figure 1 is a side elevational view illustrating a spring constructed in accordance with my invention.

Fig. 2 is a detail illustrating a portion of the spring of Fig. 1 in cross section.

Fig. 3 is a cross sectional detail taken along the line 3—3 of Fig. 2.

Fig. 4 is a bottom plan view of an end portion of a lower leaf of my spring, illustrating the manner in which loops are struck out for receiving the spring clip bolts.

Fig. 5 is a cross sectional detail taken along the line 5—5 of Fig. 4.

Fig. 6 is a view similar to Fig. 4, but illustrating a modified manner of forming a struck out retaining loop.

Fig. 7 is a cross sectional detail taken along the line 7—7 of Fig. 6.

In the construction of vehicle springs it has been common to utilize one or more clips positioned at various points along the length of the spring for retaining together the individual leaves. Various means have been utilized for properly retaining these clips upon the spring. For example in one construction the clips each consist of a U-shaped strap which is riveted to a lower leaf and which has the usual clip bolt upon the upper side of the spring. A construction of this kind is not only unsightly, but the clip bolts are apt to interfere with the frame or other parts of the vehicle. The clips have also been inverted to place the clip bolts upon the under side of the spring, but in constructions of this kind, it has been common to roll an eye in the adjacent end portion of a lower leaf for receiving the clip bolt. Rolling eyes into the leaves of the spring for holding the clip bolts is a relatively expensive operation which adds materially to the cost of the finished spring. As will be presently explained, my invention permits the clip to be positioned on the spring in inverted condition, that is with the bolt below the spring, but in place of rolling an eye into the lower leaf, I substitute a simple press operation which punches out one or more retaining loops.

Referring to the drawing for a detailed explanation of one form of my invention, in Fig. 1 I have illustrated a typical leaf spring 10 which is suitably secured to the axle 11 of the vehicle, and to the vehicle frame by means of bolt 12. Positioned along the length of the spring, I have shown spring clips 13 and 14, which can be substantially identical except for size.

Referring to Fig. 3, clip 13 is shown comprising a U-shaped metallic member or strap 16 which is fitted over the spring and which has its branches 17 depending downwardly. A suitable pin or bolt 18 extends across the lower side of the spring and thru the branches 17. Generally a clip of this kind is positioned near an adjacent end portion 19 of one of the lower leaves. It is this leaf portion 19 which in the past has been rolled into the form of an eye, for retaining the bolt 18.

In my invention I provide one or more struck out loop portions 21 which are formed integral with the spring leaf. During manufacture of the spring these loop portions can be conveniently formed by a simple press operation which serves to press or strike out portions 21 from the face of the leaf. When the spring is assembled, bolt 18 is extended thru loop portions 21, thus fixing and retaining the clip in proper position. In that form of the invention shown in Figs. 2 and 3, two loop portions are provided upon either side of the leaf portion 19, thus serving to properly retain the bolt 18 in a position extending laterally to the spring, and also to properly space the branches 17.

As shown in Figs. 6 and 7, in place of utilizing two struck out loop portions, it is possible to utilize a single portion 22. This portion 22 is struck out from the intermediate part of leaf portion 18, and serves to receive and retain the clip bolt 18.

I claim:

1. In a vehicle spring, a plurality of superposed metal spring leaves, an integral depending loop in one of the lower leaves arranged within the side margins of the spring and spaced from the end of the leaf for retaining clamping means for the leaves of said spring, said loop and the body of the leaf defining a non-circular opening for receiving a member of circular cross section, one side of said opening being substantially flat and the other side of said opening being substantially U-shaped with the ends of the U-shaped portion merging with the body of the leaf in the general plane of the leaf in which the loop is formed.

2. In a vehicle spring, a plurality of superposed metal spring leaves, an exposed portion of one of the lower leaves having a pair of slits therein extending in a direction longitudinally of said lower leaf, and spaced from the end thereof, the metal on one side of each of said slits being bowed out of the plane of the remainder of the leaf to form integral loops, and retaining means passing through said loops for securing the leaves of the spring together.

3. In a vehicle spring, a plurality of superposed metal spring leaves, an exposed portion of one of the lower leaves having a pair of slits therein extending in a direction longitudinally of said lower leaf and spaced from the end thereof, the metal between said slits being bowed out of the plane of the remainder of the leaf to form an integral loop, and retaining means passing through said loop for securing the leaves of the spring together.

FRANK J. LAHER.